(12) United States Patent
Lim

(10) Patent No.: US 6,485,078 B1
(45) Date of Patent: Nov. 26, 2002

(54) SHELF FOR BUS

(75) Inventor: Hee-Cheon Lim, Chollabuk-Do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/717,427

(22) Filed: Nov. 20, 2000

(30) Foreign Application Priority Data

Dec. 31, 1999 (KR) ............................................. 99-68352

(51) Int. Cl.[7] ................................................ B60Q 3/00
(52) U.S. Cl. ...................... 296/37.7; 296/178; 362/484
(58) Field of Search ............................... 296/178, 37.7; 105/325; 244/118.1, 118.5; 362/484

(56) References Cited

U.S. PATENT DOCUMENTS

| 2,779,864 | A | * | 1/1957 | Eichner | |
| 5,420,763 | A | * | 5/1995 | Vanderhoof | |
| 5,422,794 | A | * | 6/1995 | Drake | 244/118.5 |
| 5,441,326 | A | * | 8/1995 | Mikalonis | 296/37.7 X |
| 6,082,879 | A | * | 7/2000 | Myburgh | |
| 6,241,186 | B1 | * | 6/2001 | Calnon | 244/118.5 |

* cited by examiner

Primary Examiner—Joseph D. Pape
(74) Attorney, Agent, or Firm—Christie, Parker & Hale, LLP

(57) ABSTRACT

A shelf for bus wherein shelf brackets are fitted into first and second rails to enable the shelf brackets to be uniformly intervened therebetween, thereby allowing shelf plates to be identical in length thereof thus, reducing production cost. A lens is rotably and slidably opened and closed relative to a shelf plate, enabling easy replacement of the lens and lamp. The shelf includes a first rail extensively secured lengthwise to a roof frame of the bus, a second rail securely installed at a side panel of a bus interior in the same length as that of the first rail, a shelf bracket formed at both ends thereof with a first and a second fitting part and secured at the first and second rails for sliding while fitted into the first and the second rails, and a shelf plate fixed at an upper surface of the shelf bracket.

7 Claims, 5 Drawing Sheets

SHELF FOR BUS

BACKGROUND OF THE INVENTION

1. Field of the Invention

The present invention relates to a shelf, and more particularly to a shelf for a bus installed inside the bus for placing cargoes and the like.

2. Description of the Prior Art

Generally, a bus carrying many passengers is equipped therein with shelves for accommodating passengers' belongings such as baggage and the like.

As illustrated in FIG. 5, the shelves are composed of two shelf assemblies 50, each lengthwise arranged at an upper side of inner area of the bus and a plurality of brackets 52 each secured to a roof frame 51 for supporting the shelf assembly 50.

The shelf assembly 50 includes, as illustrated in FIG. 6, a shelf plate 53 manufactured lengthwise, a frame 54 secured to an inner lateral end of the shelf plate 53 and coupled to a bottom surface of the shelf bracket 52 and a reinforcement 55 crosswise coupled to the shelf plate 53 for reinforcing a vertical load strength of the shelf.

Particularly, the frame 54 mounted with a mood lamp for illuminating the interior of the bus includes a void 57 formed at the frame 54 with an opening therein for illumination, a lamp 58 secured at the void 57 and a lens 59 for blocking the opening and for adjusting color, intensity and the like of the illuminated light.

Of course, the lens 59 is inserted at one end thereof into a first fitting part 60 formed at an inner end of the opening of the frame 54 while the other end thereof includes a second fitting part 61 formed at an opposite side of the first fitting part 60 and formed widely for fitting the lens 59 and a key mold 62 for securing the lens 59 after fitted into the second fitting part 61.

However, there is a problem in the shelf plate formed lengthwise thus described according to the prior art in that quite a few workers are involved for assembly thereof because the shelf plate is heavy and lengthy, complicating the shelf assembly work and consuming lots of man power.

There is another problem in that, during breakage of lamp or lens thereof, it is very difficult to remove the broken lamp of lens because the lens is tightly inserted into the first and second fitting parts, complicating replacement work of lamp or lens.

There is a further problem in that the shelf assembly includes many components including the shelf plate, shelf bracket, reinforcement, frame, lens and the like, increasing production cost, but decreasing assembly efficiency.

There is still a further problem in that the shelf brackets follow the arrangement of the roof frame when the shelf brackets are installed on the roof, making it difficult to arrange same at a predetermined uniform space therebetween. Consequently, each shelf plate has to be made in a different length, increasing the manufacturing costs.

SUMMARY OF THE INVENTION

The present invention is disclosed to solve the aforementioned problems and it is an object of the present invention to provide a shelf for bus adapted to simplify the construction of shelf assembly and to reduce weight, to uniformly maintain pitches of shelf brackets installed on the roof for cost reduction and to make it easy for the lens and lamp to be replaced.

In accordance with the object of the present invention, there is provided a shelf for bus, the shelf comprising:

a first rail extensively secured lengthwise to a roof frame of the bus;

a second rail securely installed at a side panel of a bus interior in the same length as that of the first rail;

a shelf bracket formed at both ends thereof with a first and a second fitting part and secured at the first and second rails for sliding while fitted into the first and the second rail; and a shelf plate fixed at an upper surface of the shelf bracket.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE PRESENT INVENTION

Figure 1:
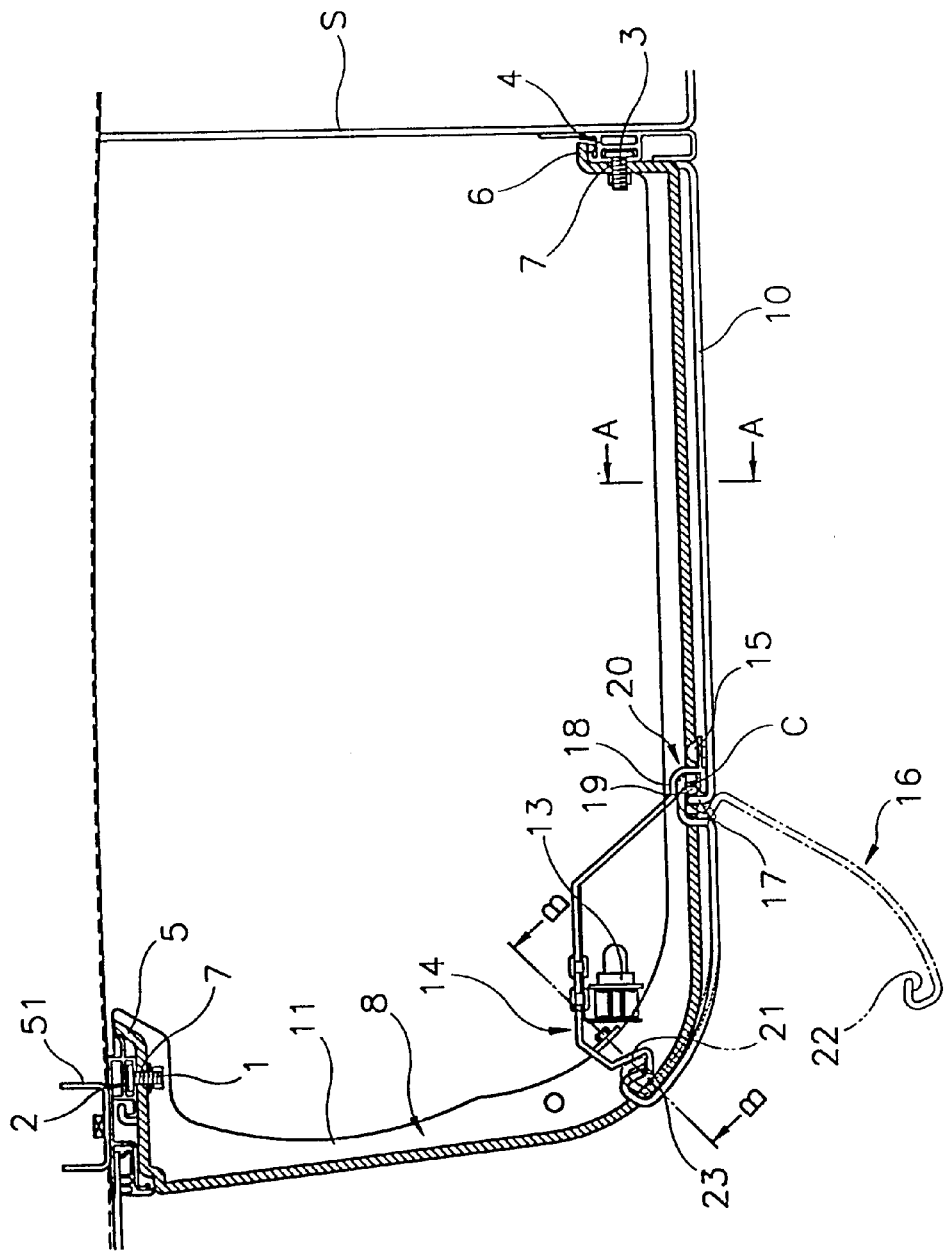
FIG. 1 is a sectional view for illustrating a bus shelf according to the present invention.
Figure 2:
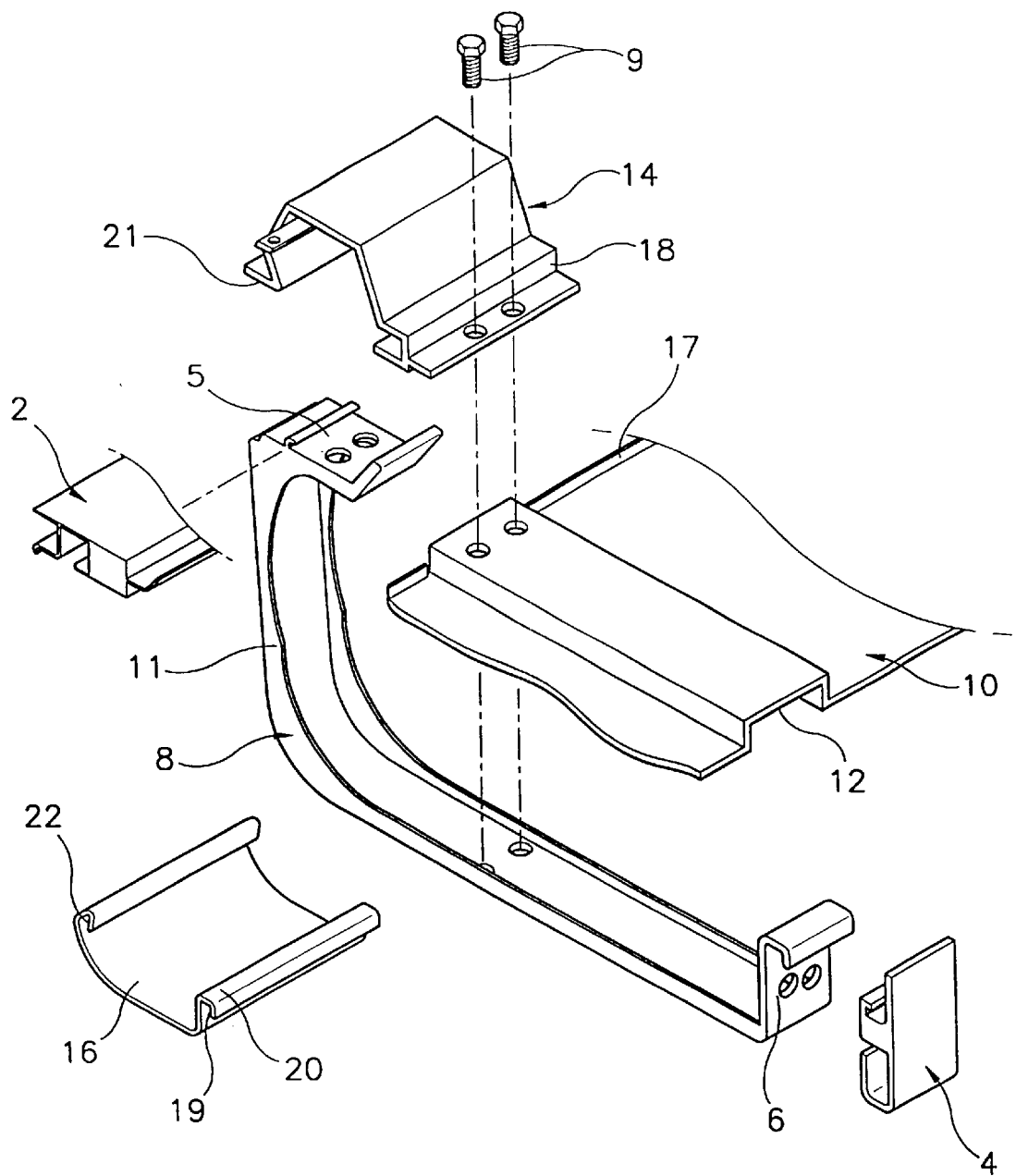
FIG. 2 is an exploded perspective view of FIG. 1.
Figure 3:
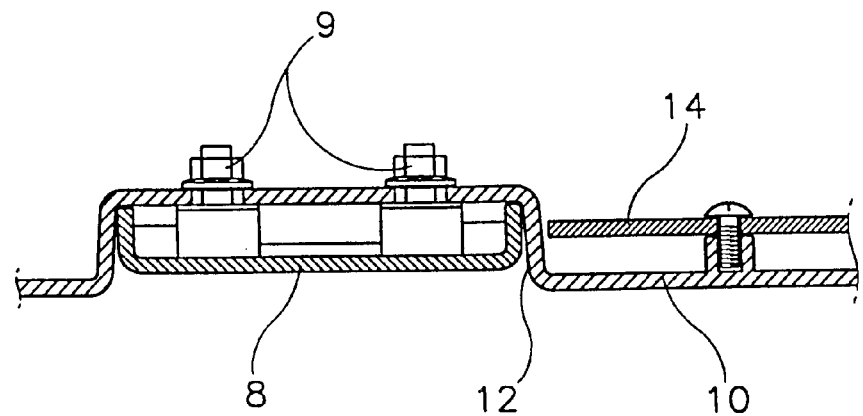
FIG. 3 is a sectional view taken along line A—A of FIG. 1.
Figure 4:
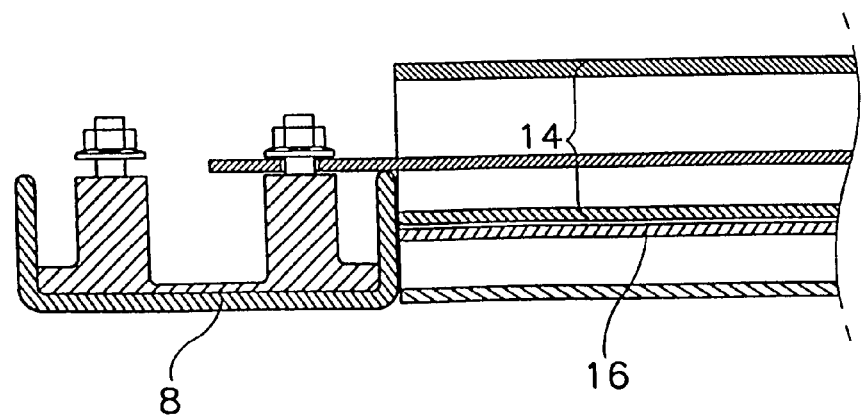
FIG. 4 is a sectional view taken along line B—B of FIG. 1.
Figure 5:
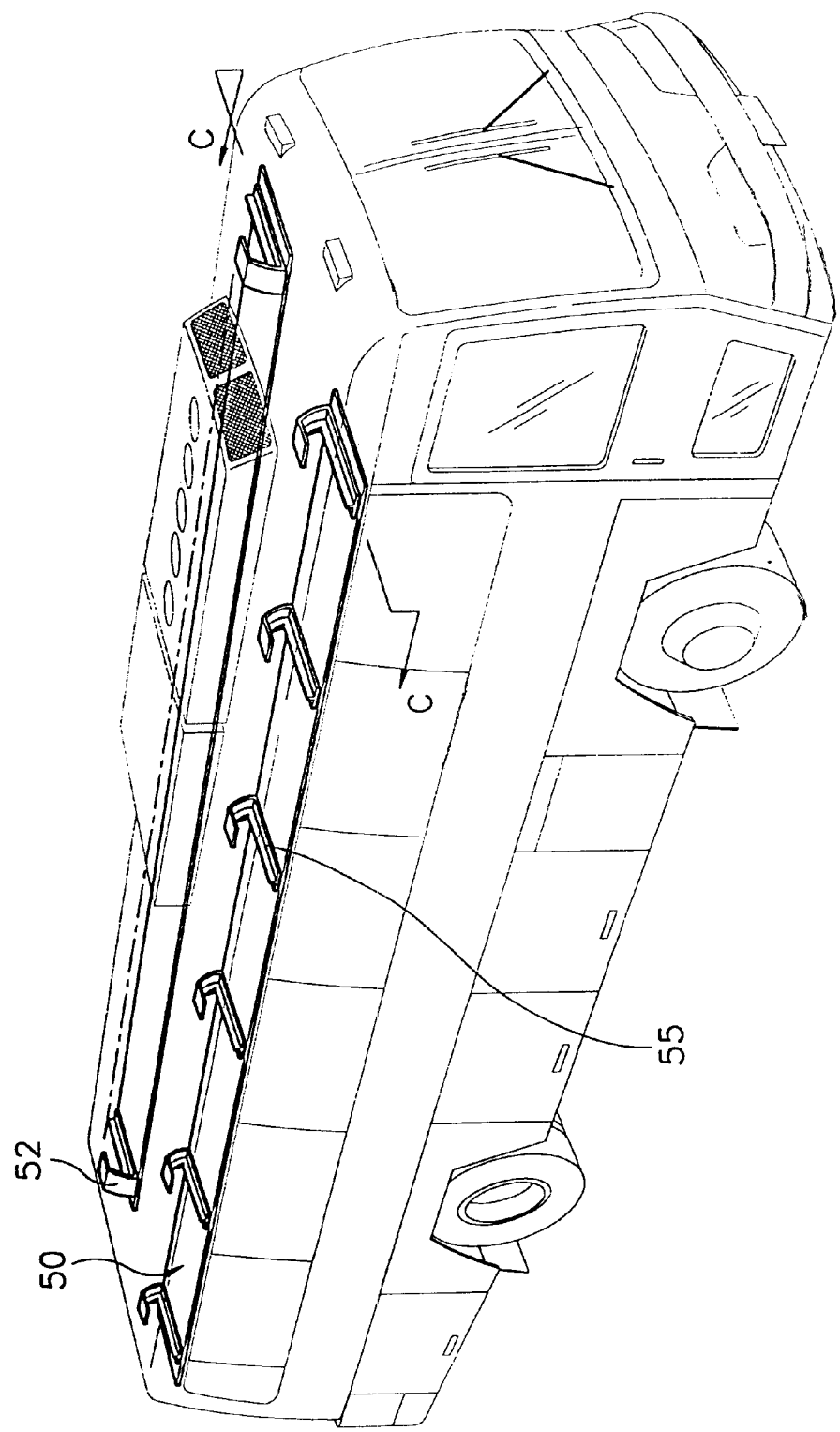
FIG. 5 is a schematic perspective view for illustrating an installed state of a bus shelf according to the prior art.
Figure 6:
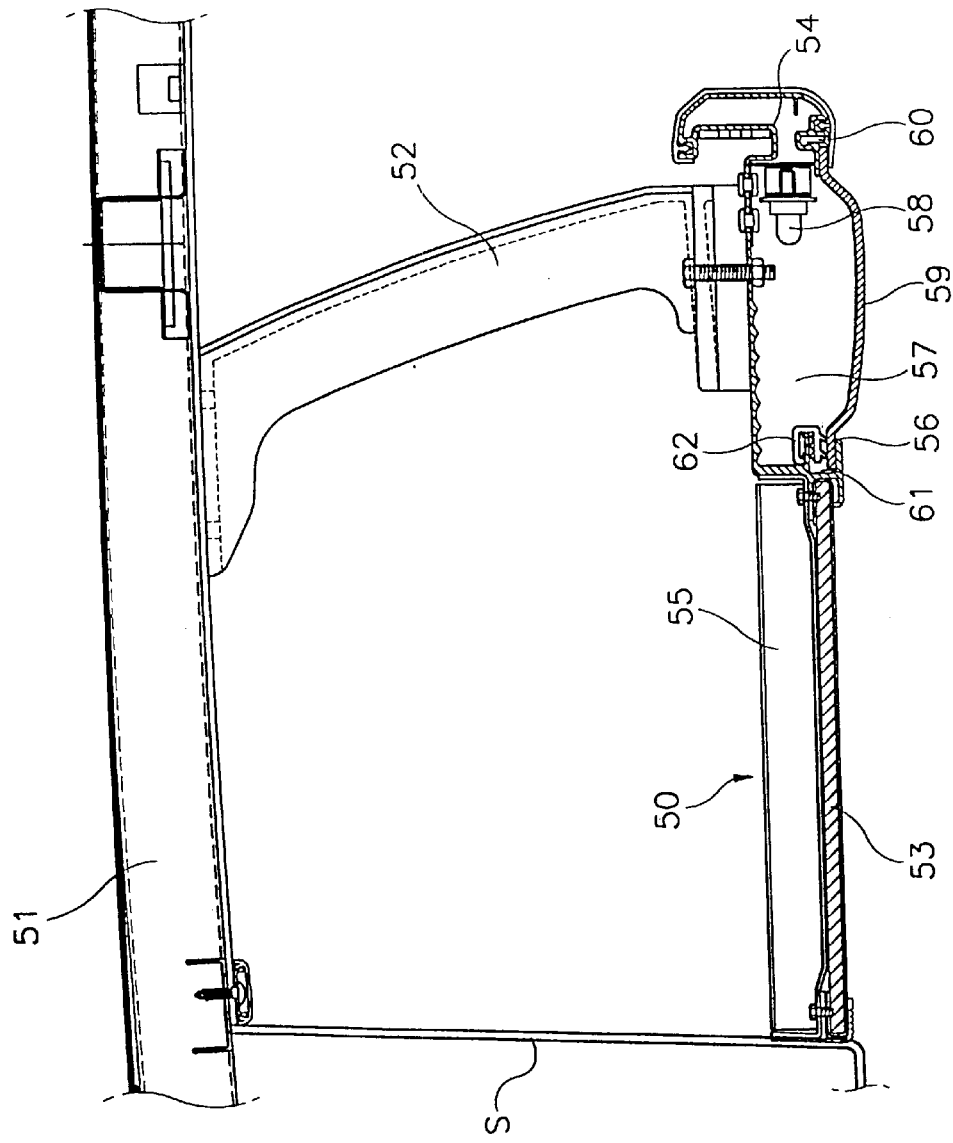
FIG. 6 is a sectional view taken along line C—C of FIG. 5.

FIGS. 1, 2, 3 and 4 are respectively a sectional view, an exploded perspective view, a sectional view taken along line A—A of FIG. 1 and a section view taken along line B—B of FIG. 1, where the shelf includes a first rail 2 extensively secured lengthwise to a roof frame 51 of a bus and equipped with bolts 1 each at a predetermined interval, a second rail 4 securely installed at a side panel (S) of a bus interior in the same length as that of the first rail 1 and equipped with bolts 3 each at a predetermined interval, a shelf bracket 8 formed at both ends thereof with a first and second fitting parts 5 and 6 for being secured at the first and second rails 2 and 4 for sliding while bolt holes 7 are formed to insert the bolts 1 and 3, respectively, and a shelf plates 10 fixed by bolts 9 at an upper surface of the shelf bracket 8 and formed by injection molding at the same length.

Particularly, the shelf bracket 8 is formed with a rib 11 extending from an edge of the shelf bracket to reinforce the shelf bracket strength against vertical loads, and over the rib 11, a groove part 12 is formed at the shelf plate 10 to restrict the position of the shelf plate 10.

Furthermore, the shelf plate 10 is fixedly mounted at an inner end thereof with a lamp housing 14 formed with a lamp 13 by way of a bolt 15. The lamp housing 14 is mounted at a tip end thereof with a lens 16 mounted by hinge means for rotation, and open/close means is provided in opposite direction from the housing 14 and hinge means of the lens 16 in order to separate the lens 16 from the housing 14 or to couple the lens 16 to the housing 14.

The hinge means includes a hitching part 17 perpendicularly formed at an inner tip end of the shelf plate 10, a bend portion 18 formed at the housing 14 to constitute a chamber (C) with the hitching part 17 and a lens rotating part 20 formed inside the chamber (C) for sliding motion and formed with a stopper 19 for a longitudinal end thereof to be hitched thereon when the lens 16 is opened.

The open/close means is composed of a hitching groove 21 formed at a longitudinal end of the housing 14, and a hitching jaw 22 formed at a longitudinal end of the lens 16 in order to be inserted into the hitching groove 21 when the lens 16 is closed and to be accommodated when the lens 16 is moved. The hitching groove 21 is arranged therein with a hitching protruder 23 for the hitching jaw 22 to be hitched lest the lens 16 should be easily opened.

Now, operational effect of the present invention thus constructed will be described.

First, an operator respectively fixes the first and second rails 2 and 4 to the roof frame 51 and the side panel (S) in order to assemble the shelf.

When the first and second rails 2 and 4 are secured, the first and second fitting parts 5 and 6 of the shelf bracket 8 are inserted into sides of the first and second rails 2 and 4 and simultaneously moved to allow the bolts 1 and 3 to be inserted into the bolt holes 7.

When the shelf bracket 8 is fitted into the first and second rails 2 and 4 mounted at the roof frame 51 and the side panel (S), the shelf brackets 8 can be mounted to each at a predetermined interval regardless of a layout of the roof frame 51.

Furthermore, when each shelf bracket 8 is installed at a predetermined interval, a shelf plate 10 can be manufactured using injection molding because the shelf plate 10 placed thereto can be formed at the same length, thereby reducing the manufacturing cost.

When the bolts 1 and 3 are inserted into the bolt holes 7, the shelf bracket 8 is secured where the groove part 12 of the shelf plate 10 is accommodated to the shelf bracket 8. When the shelf plate 10 is secured at the shelf bracket 8, the bolt 9 is used to fasten the shelf plate 10 and the shelf bracket 8. At the same time, the lamp housing 14 is coupled to the longitudinal end of the shelf plate 10.

At this time, the hitching part 17 of the shelf plate 10 is hitched by the stopper 19 of the lens 16, such that the lens 16 is made to rotate and slide at one side thereof at the chamber (C) formed between the shelf plate 10 and the housing 14.

When the shelf bracket 8 and shelf plate 10 are joined, and the lens 16 and housing 14 are coupled, the lens 16 is closed to allow the hitching jaw 22 to be hitched by the hitching groove 21.

When the lamp 13 breaks or burns, the operator can hold and pull the lens 16 toward the left in relation to FIG. 1.

When the lens 16 is pulled, the stopper 19 is enabled to move to the left within the chamber (C), such that the hitching jaw 22 can be slipped out of the hitching groove 21, where the stopper 19 serves to function as a hinge within the chamber (C) to allow the lens 16 to be opened.

When the lens 16 is opened, the lamp 13 is replaced and the lens 16 is closed such that the hitching jaw 22 of the lens 16 is hitched by the hitching protruder 23 at the hitching groove 21 and the lens is secured in the closed position.

As apparent from the foregoing, there is an advantage in the shelf for bus thus described according to the present invention in that shelf brackets are fitted into first and second rails to enable the shelf brackets to be uniformly intervened therebetween, thereby allowing the shelf plates to be identical in length thereof, thus, reducing production cost.

There is another advantage in that the lens is rotably and slidably opened and closed, enabling easy replacement of the lens and lamp.

What is claimed is:

1. A shelf for bus, the shelf comprising:

a first rail extensively secured lengthwise to a roof frame of the bus;

a second rail having the same length as the first rail securely installed at a side panel of a bus interior;

a shelf bracket having a first fitting part at a first end and a second fitting part at a second end, the shelf bracket mounted at the first and second rails for sliding while mounted at the first and the second rails; and a shelf plate fixed at an upper surface of the shelf bracket.

2. The shelf as defined in claim 1, wherein the shelf bracket is secured to the first and second rails by a plurality of bolts each placed at a predetermined interval, and by bolt holes formed at the shelf bracket into which the bolts are screwed for coupling the shelf bracket and the first and second rails.

3. The shelf as defined in claim 1, wherein the shelf bracket comprises a rib to reinforce the shelf bracket strength against vertical loads, and a groove part for mating with the shelf bracket to restrict the position of the shelf plate relative to the shelf bracket.

4. The shelf as defined in claims 1, 2 or 3, wherein the shelf comprises:

a lamp housing secured at an inner end of the shelf plate and formed with one opening of a predetermined size to internally mount a lamp;

a lens rotably secured to an end of the lamp housing by way of hinge means; and open/close means provided opposite of the housing and the hinge means of the lens for separating the lens from the housing and coupling the lens to the housing.

5. The shelf as defined in claim 4, wherein the hinge means comprises:

a hitching part perpendicularly formed at an inner tip end of the shelf plate;

a bend portion formed at the housing to constitute a chamber with the hitching part; and a lens rotating part within the chamber and comprising a stopper allowing an end of the lens rotating part to be hitched on the stopper when the lens is opened.

6. The shelf as defined in claim 4 wherein the open/close means comprises:

a hitching groove formed at a longitudinal end of the housing; and a hitching jaw formed at a longitudinal end of the lens for insertion into the hitching groove when the lens is closed and to be accommodated when the lens is moved.

7. The shelf as defined in claim 6, wherein the hitching groove is arranged therein with a hitching protruder for the hitching jaw to be hitched lest the lens should be easily opened.

* * * * *